Jan. 19, 1943. S. F. MASHBIR ET AL Re. 22,253
TESTING AND WEIGHING DEVICE
Original Filed April 11, 1931 5 Sheets-Sheet 1
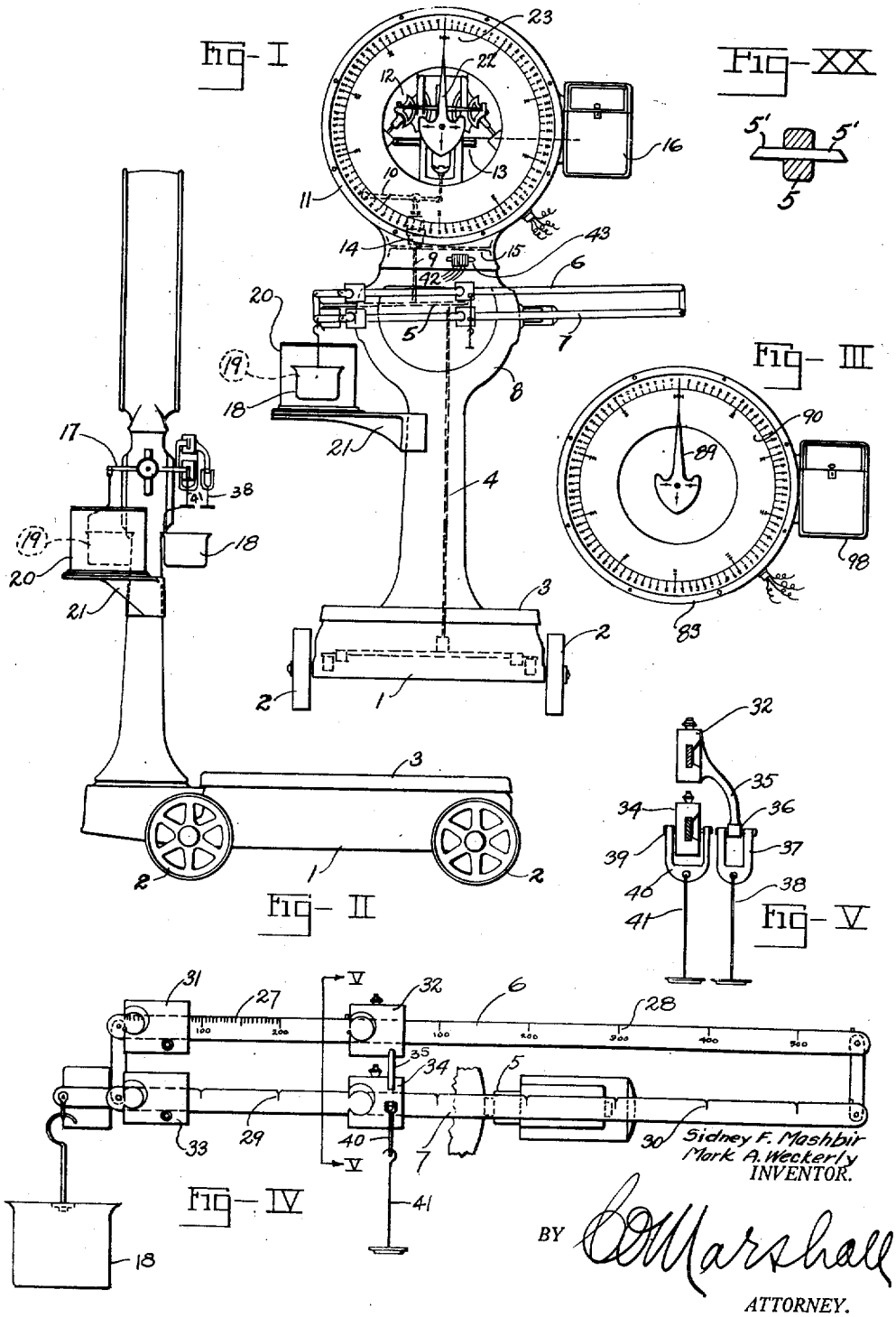

Jan. 19, 1943. S. F. MASHBIR ET AL Re. 22,253
TESTING AND WEIGHING DEVICE
Original Filed April 11, 1931 5 Sheets-Sheet 2
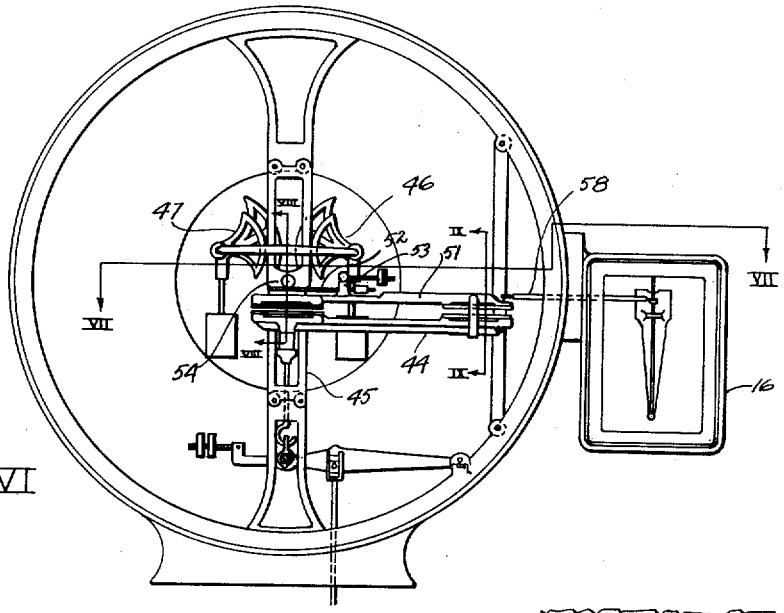
Fig-VI
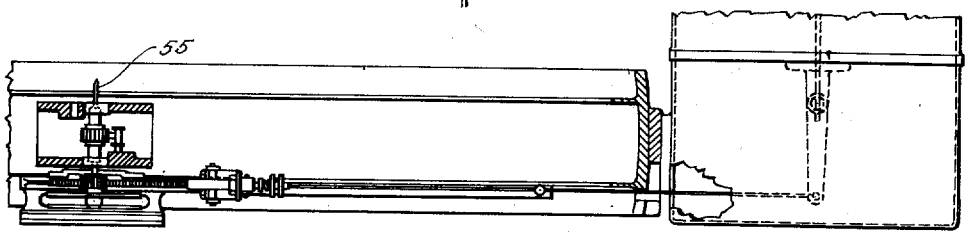
Fig-VII
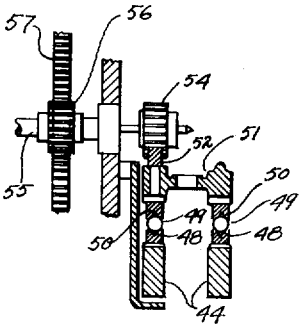
Fig-VIII
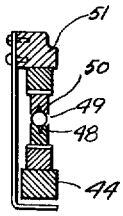
Fig-IX
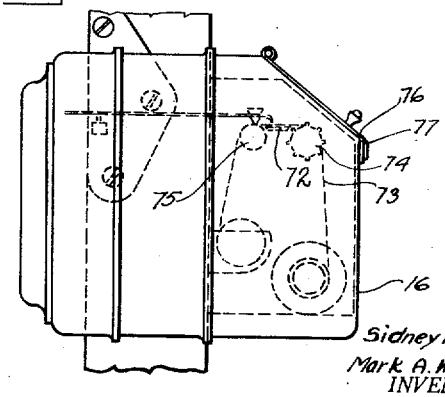
Fig-X
Sidney F. Mashbir
Mark A. Weckerly
INVENTOR.
BY C. O. Marshall
ATTORNEY.

Jan. 19, 1943. S. F. MASHBIR ET AL Re. 22,253
TESTING AND WEIGHING DEVICE
Original Filed April 11, 1931 5 Sheets-Sheet 3
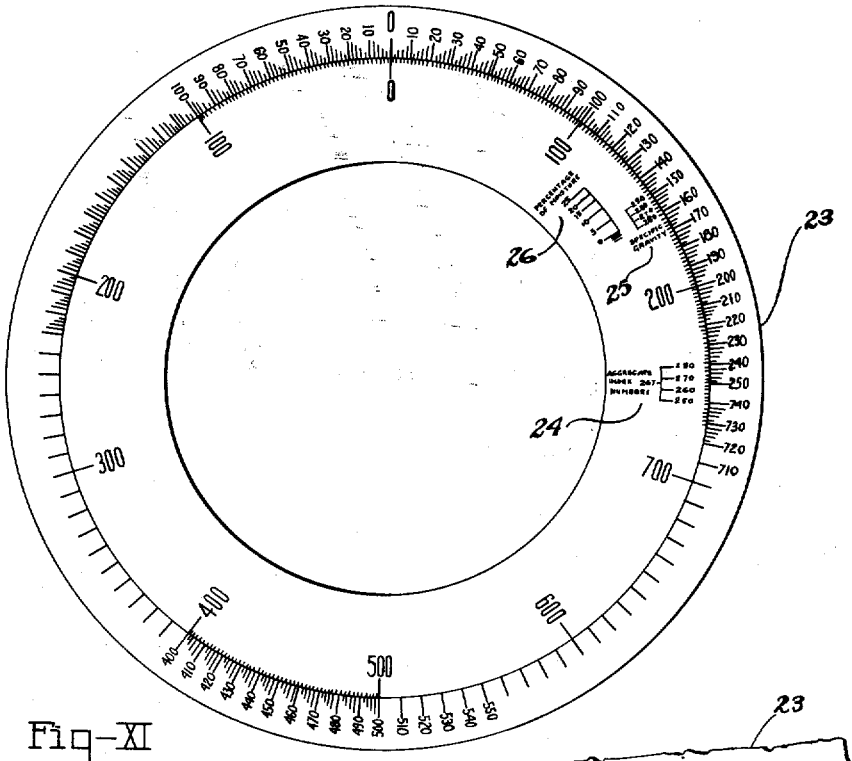
Fig—XI
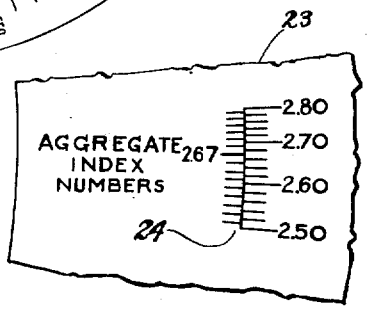
Fig—XIII
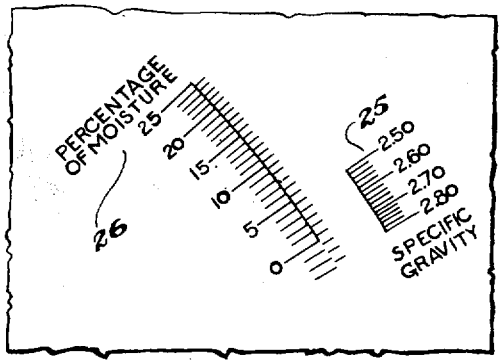
Fig—XII
Sidney F. Mashbir
Mark A. Weckerly
INVENTOR.
BY C. M. Marshall
ATTORNEY.

Jan. 19, 1943. S. F. MASHBIR ET AL Re. 22,253
TESTING AND WEIGHING DEVICE
Original Filed April 11, 1931 5 Sheets-Sheet 4
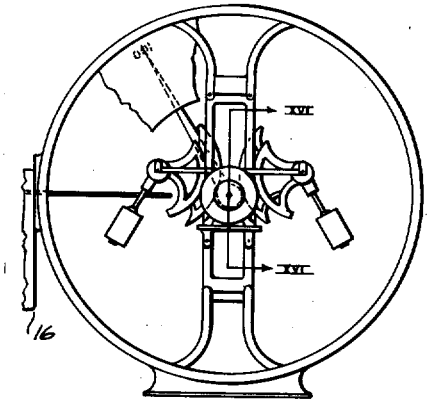
FIG-XIV
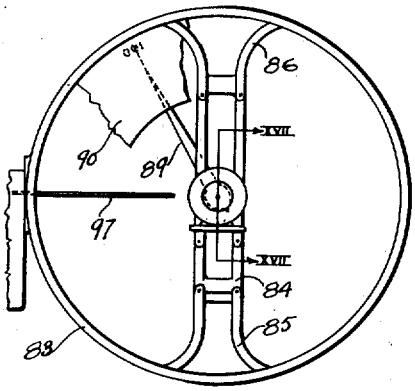
FIG-XV
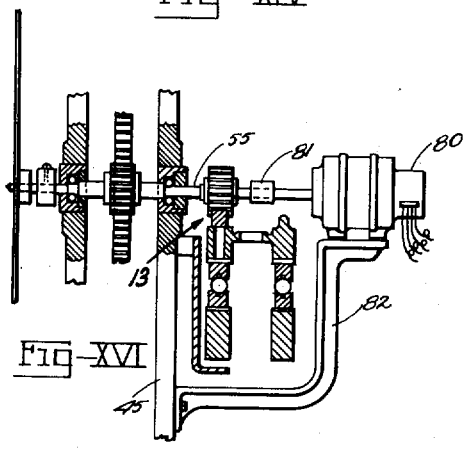
FIG-XVI
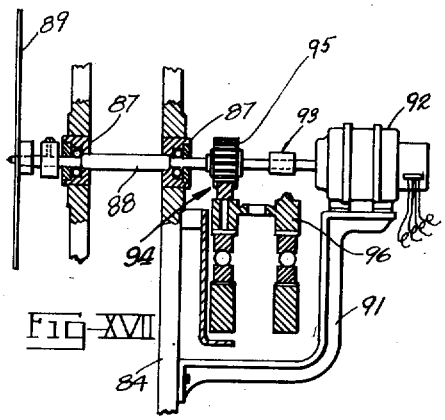
FIG-XVII
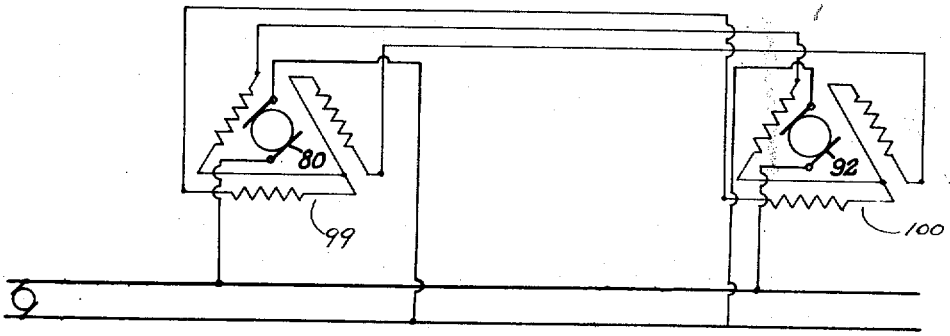
FIG-XVIII
Sidney F. Mashbir
Mark A. Weckerly
INVENTOR.
BY C. O. Marshall
ATTORNEY.

Jan. 19, 1943. S. F. MASHBIR ET AL Re. 22,253
TESTING AND WEIGHING DEVICE
Original Filed April 11, 1931 5 Sheets-Sheet 5
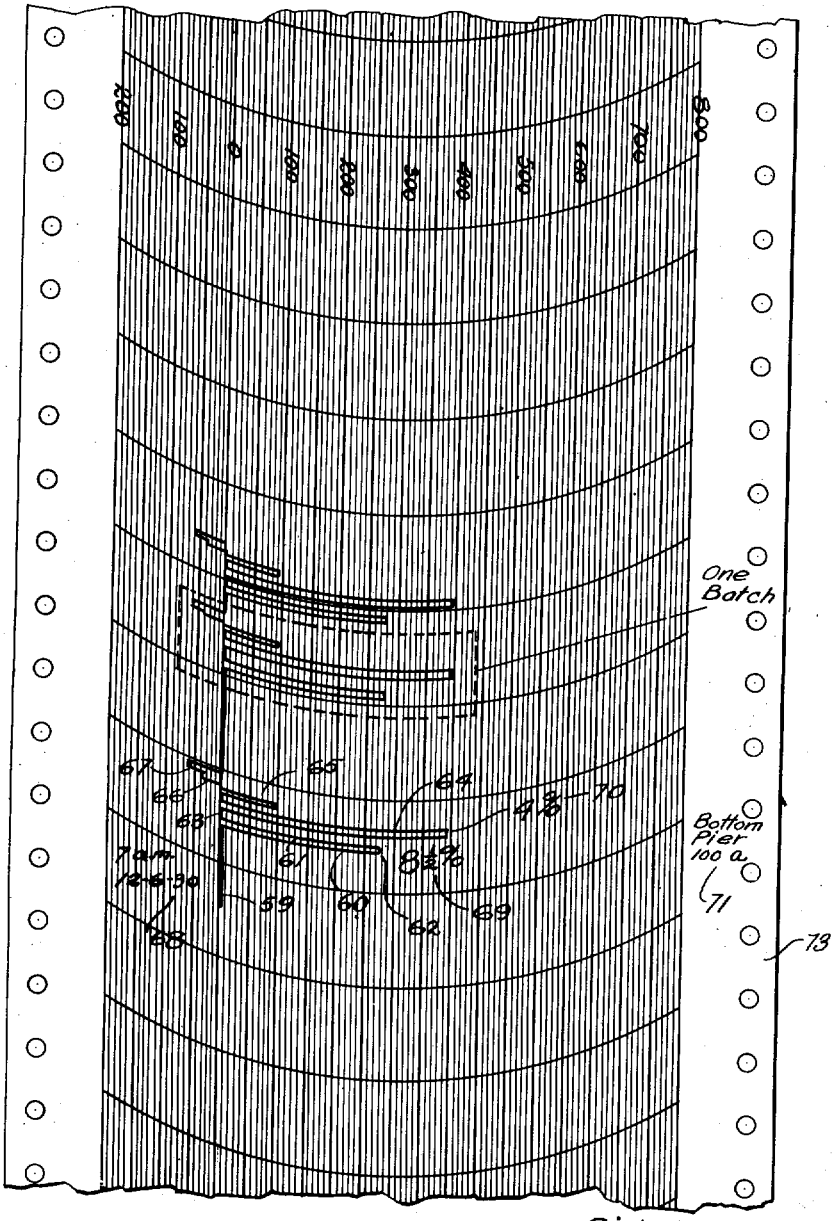
Fig—XIX
Sidney F. Mashbir
Mark A. Weckerly
INVENTOR.
BY C. O. Marshall
ATTORNEY.

Reissued Jan. 19, 1943

Re. 22,253

UNITED STATES PATENT OFFICE 22,253

TESTING AND WEIGHING DEVICE

Sidney F. Mashbir, Washington, D. C., and Mark A. Weckerly, Toledo, Ohio, assignors to Toledo Scale Company, Toledo, Ohio, a corporation of New Jersey Original No. 2,176,864, dated October 17, 1939, Serial No. 529,508, April 11, 1931. Renewed October 28, 1938. Application for reissue March 19, 1940, Serial No. 325,209

40 Claims. (Cl. 265—44)

This invention relates generally to the art of making concrete in which the ingredients are accurately proportioned independently of the amount of surface moisture contained in the aggregates and more particularly to devices for determining such moisture content, compensating for the same, and keeping an accurate record of the composition of each batch. The presence of variable amounts of free moisture in aggregates, at the time they are utilized for concrete manufacture, is almost universal. Such moisture is principally due to precipitation and aggregate washing operations. Variations in these factors and their combination coupled with evaporation under varying atmospheric conditions cause wide variations in the moisture content of aggregates on different jobs and sometimes result in relatively large fluctuations within sort intervals on the same job. Because of the importance of using proper water cement ratio, it is desirable that the surface moisture of the aggregates be determined and such moisture compensated for in mixing. This invention, therefore, includes separately and collectively the steps of and means for determining from time to time the percentage of surface moisture present in samples of aggregate, setting weighing mechanism to compensate for surface moisture content and thus weighing out proper amounts of aggregate. The invention, in another phase, includes the further step of causing the amount of moisture in a weighed lot of aggregate to be indicated so that sufficient water may be added to make the proper water cement ratio.

The invention further contemplates the automatic making of records of the moisture content and weight of aggregates which form ingredients of batches of concrete with records of the time and order of weighing combined in some instances with steps of and means for making manual notations on the same record so that the time of mixing and the location where each batch is poured, can be readily ascertained at a later date if faults or peculiarities in the structure appear; to determine whether such faults or peculiarities were caused by proportions of the mixture or by other conditions. Such records, especially when made under the supervision of an inspector, may be instrumental in preventing litigation involving large sums of money. It has also been found very desirable, especially on large jobs where a number of concrete mixers are employed, to indicate and/or record the performance of the different mixers in the office of a supervising engineer. This not only at all times informs him of the quality of the concrete poured, but it also enables him to conveniently check the progress of the work. The invention also includes the steps of and for providing such remote indication and/or recording.

The principal object of the invention is, therefore, the provision of improved means for enabling the accurate proportioning of concrete mixtures.

Another object of the invention is the provision of improved means for readily determining the percentage of surface moisture in concrete aggregates.

Another object is the provision of means for showing from the weight of the regular run, the exact weight of the aggregates not including surface moisture.

Another object is the provision of means for indicating the weight of regular run aggregate.

A still further object is the provision of improved means for showing the actual weight of free or surface moisture contained in the aggregates.

Still another object is the provision of means for indicating the water of crystallization contained in such aggregates.

A further object is the provision of means for determining the specific gravity of concrete aggregates.

Still another object is the provision of means whereby a sieve analysis of the aggregates may be made.

Still another object is the provision of means for accurately compensating for surface moisture in the aggregates.

A still further object is the provision of means for obtaining the actual weight of concrete mixture ingredients.

Another object is the provision of means for making a permanent ink record of the weighing operations.

Another object is the provision of means for indicating and recording the result of such operations at points remote from the device; and Still another object is the provision of means to facilitate making manual notations on the permanent record.

These and other objects will be apparent from the following description in which reference is had to the accompanying drawings and wherein similar reference numerals designate similar parts throughout the several views.

In the drawings:

Figure I is a front elevational view of a scale embodying the invention.

Figure II is a side elevation thereof.

Figure III is a front elevational view of a remote indicating and recording mechanism.

Figure IV is an enlarged detailed view of the beam mechanism.

Figure V is a cross sectional view substantially on the line V—V of Figure IV showing the arrangement of the poises and the percentage weight hangers.

Figure VI is a back elevational view, with the cover removed, of the scale head showing the counterbalancing, recording and recorder driving mechanisms.

Figure VII is an enlarged sectional plan view of the recorder driving mechanism substantially along the line VII—VII of Figure VI.

Figure VIII is an enlarged cross sectional view through the recorder driving mechanism substantially along the line VIII—VIII of Figure VI and showing its operative connection with the indicating mechanism.

Figure IX is an enlarged sectional view through the ball bearing track substantially along the line IX—IX of Figure VI.

Figure X is an enlarged side elevational view of the automatic and manual recording mechanism.

Figure XI is an enlarged detailed view of the indicating and calculating chart.

Figures XII and XIII are magnified portions of the specific gravity, percentage of moisture indications and index numbers which are factored by the weight of the sample in relation with its specific gravity.

Figure XIV is a back view of the indicator housing, parts being removed and parts broken away, and showing the location of the remote indicator actuating generator.

Figure XV is a back view of the remote indicator, parts being removed and parts broken away, showing the synchronous driving motor.

Figure XVI is a cross sectional view along the line XVI—XVI of Figure XIV.

Figure XVII is a cross-sectional view along the line XVII—XVII of Figure XV.

Figure XVIII is an electrical wiring diagram.

Figure XIX is an enlarged portion of the recording strip.

Figure XX is a detail view showing fulcrum pivots of a lever employed in the mechanism.

Referring to the drawings in detail, the embodiment of the invention is shown incorporated in a scale of a well known type fully described in United States Patent No. 1,543,768 and in our description we will describe it only in so far as is necessary to properly disclose our invention. The scale consists of a base 1, which for easy transportation from place to place, is mounted upon wheels 2. Load supporting levers (not shown) are suitably supported within the base and these levers support a load receiving platform 3. The load supporting lever system, in a manner which is well known, is connected by means of a rod 4 to an intermediate lever 5 to which, parallel to its longitudinal axis, a plurality of index beams 6 and 7 are secured. This lever 5 is fulcrumed upon knife edge pivots 5' within a column-like housing 8 mounted upon the rear of the base 1. The beams 6 and 7, however, are so arranged that they are in front of the column in an easily accessible position. A short connecting rod 9 transmits the force to a motion multiplying lever 10 which is mounted within a substantially watchcase-shaped housing 11 which surmounts the column-like housing 8. Within this housing an automatic counterbalancing pendulum mechanism 12 and automatic recorder drive mechanism 13 are located. To prevent the entrance of dust and moisture which might interfere with the accurate working of the counterbalancing mechanism, an oil sealing device 14 surrounds the connecting rod and effectively seals the opening in a partition 15 in the lower portion of the watchcase-shaped housing 11, through which the rod 9 extends. An automatic recording device 16 is fastened to one side of the housing 11 and co-operates with the automatic counterbalancing mechanism 12 to record the results of all the weighing operations.

For the purpose of determining the specific gravity of concrete aggregates, the intermediate lever 5 has secured to one end a two armed bracket 17 which extends at right angles to its longitudinal axis and parallel to its axis of movement. The ends of the arms of this bracket 17 are provided with colinear pivots 17' and 17'' from which receptacles 18 and 19 are suspended, one receptacle from one pivot and the other receptacle from the other pivot. The receptacle 19 is adapted to hang in a water-filled tank 20 which rests on the shelf-like bracket 21 fastened to the column 8. It will be observed that the load counterbalancing pendulum mechanism 12 is set at approximately three-fourths of its total travel when the indicator 22, which is connected to the pendulum and indicates their movement, is at the zero position on the chart 23 which is stationed in back of the indicator and fastened to the housing 11. This permits movement of the indicator in clockwise and anti-clockwise directions. The anti-clockwise movement is about three-fourths the distance around the dial and it is used in connection with the beam equipment in weighing concrete mixture ingredients. Its travel in the clockwise direction is for straight weighing up to about one-fourth of the automatic weighing capacity of the scale and for determining specific gravity, moisture content, and making sieve analysis of aggregates.

The scale herein described may be used for straight weighing up to one-fourth of its total capacity; for example, when the scale has a chart capacity of 1000 pounds, that is, the capacity which can be counterbalanced by the automatic load offsetting pendulums, loads up to approximately 250 pounds can be weighed. When the load is placed on the platform 3, it will depress the supporting levers within the base 1 and a force, proportionate to the ratio of the levers, is transmitted through the rod 4 to the lever 5, where it is diminished by the ratio of this lever and transmitted by the rod 9 and the lever 10 to the pendulum mechanism 12. These pendulums will swing outwardly and upwardly from their initial position an angular distance proportional to the load and the indicator, which is operatively connected thereto, will revolve in a clockwise direction and point to the indicia representing the proper weight.

When it is desired to determine specific gravity of an aggregate; let us assume the aggregate in the example is sand; the operator will fill the cup 18 on the end of the lever 5 until the indicator 22 points to the figure 2.67 on the table marked "aggregate index numbers" (Figure XIII) on the chart 23. The scale illustrated is calibrated to employ a sample of dry sand weighing 2 lbs. for determining specific gravity. The sand used for this determination is surface dry sand, that is, sand which has been dried at a moderate heat, for instance, exposed to the summer sun. This moderate heat evaporates the water clinging to the sand particles. It should not, however, be of such intensity so as to drive off the water of crystallization. It is to be understood that the receptacles 18 and 19 are exactly similar in size, shape and weight. When the proper amount of material has been placed in the receptacle 18, the two receptacles are reversed in position, that is, the receptacle 18 with the sand contained therein, is carefully plunged into the water in the tank 20. As the specific gravity is the ratio of the mass of a body to the mass of an equal volume of water, the force exerted by the submerged sand on the scale counterbalancing mechanism is less and the indicator will move in an anti-clockwise direction and indicate on the table 25 marked "specific gravity" (Figure XII), the specific gravity of the sample of sand which in this example, let us assume, is 2.64. When the receptacles 18 and 19 are reversed, the receptacle 19 which previously was submerged in the water in the tank 20, before hanging it in the position occupied by the receptacle 18, must be wiped dry. When the receptacle 18 with the sand contained therein is submerged, care must be taken in lowering it into the water to prevent undue agitation, as the surging thereof would have the effect of preventing the indicator 22 from coming to rest rapidly. Care in this operation also prevents sand from being washed out of the receptacle. Furthermore, care must be taken to see that sufficient water is in the tank 20 so that it completely covers the sample receptacle.

In determining the moisture content of the sand after the specific gravity has been established, the operator removes the receptacle containing the sand in the previous example, carefully empties, and washes it and again immerses the empty receptacle in the water. When both receptacles 18 and 19 are empty and the indicator points to the zero on the chart, regular run sand, that is, the sand as it comes from the builder's supply yard is poured into the front receptacle 18 until the indicator 22 points to the figure 2.64 on the table 24 (Figure XIII). It will be observed that the specific gravity of the sample of sand in the previous example was determined as being 2.64. The next steps in the determination of the moisture are to remove the empty submerged receptacle and to carefully dry it and then again exchange the position of the two receptacles, that is, the empty receptacle is now suspended from the pivot 17' carried by the front arm of the bracket 17 and the receptacle containing the regular run sand is carefully lowered into the tank 20 and suspended from the co-linear pivot 17'' carried by the back arm of the bracket 17. The percentage of moisture will now be automatically shown on the table 26 marked "percentage of moisture" (Figure XII). In the example, this percentage will be assumed to be 8½ per cent of the weight of the sand per se.

Having thus determined the percentage of surface moisture in sand, the next step in the operation of producing a theoretically correct concrete mixture is to weigh out the required amount of sand for the batch and to compensate for the surface moisture contained therein. The receptacle containing the sand is again removed from its hanger, carefully emptied, washed and again immersed. Both receptacles are now empty. The beams 6 and 7 which are secured to the intermediate lever 5 are provided with series of indicia 27 and 28, 29 and 30 which co-operate with poises 31, 32, 33 and 34. The scale in which we have shown our invention embodied is of the so-called portable type and has a comparatively small platform 3 and when used for the purpose herein described, it is necessary that an auxiliary container be placed thereon to hold the concrete mix constituents. This container may be a barrel or a box having the proper size, and its weight is counterbalanced or "tared out" by moving the poise 31 towards the right, from its initial position until the indicator 22 again points to the zero indicium of the chart 23. The poise 32 is now moved along the beam 6 over the series of indicia 28 to the indicium which represents the amount of surface dry sand desired. The poise 32 has a downwardly projecting arm 35 which is equipped with a pivot 36 at its lower end from which a stirrup 37 and a weight hanger 38 are suspended. The length of the arm 35 is such that the knife edge of the pivot 36, fixed in its lower end, is in the plane of the pivots 5' in the lever 5. As the pivot 39, from which the stirrup 40 and weight hanger 41 are suspended from the poise 34, is directly in this plane, a special arm is not necessary and the pivot 39 is fixed directly into the body of the poise 34. When in their zero position, the pivots 36 and 39 are colinear with the fulcrum pivot of the intermediate lever 5. The poise 32 is placed in a position to counterbalance, let us say in this example, 259 pounds of sand; the indicator 22 has moved in the anti-clockwise direction and indicates 259 pounds on the chart. The sand, however, contains a certain amount of moisture which we have found to represent 8½ per cent of the weight of the sand per se. A series of percentage weights 42 are provided which normally hang on a bracket 43 fastened to the lower portion of the housing 11. The weight representing 8½ per cent is now taken and placed on the hanger 38 suspended from the poise 32. This weight increases the counterbalancing effect of the poise 32 exactly 8½ per cent and the indicator 22 will point to the 281 pounds indicium on the chart 23 which is the total weight of sand and adhering moisture which must be weighed out to obtain exactly 259 pounds of surface dry sand. Sufficient regular run sand is now placed in the container standing on the platform of the scale to bring the indicator 22, which is now moving in a clockwise direction, to the zero indicium. In the proper compounding of concrete mixes, it is customary that more than one kind of sand or other aggregates be used. Let us assume that the next step is to add 375 pounds of a coarser aggregate. Without removing the sand from the container or disturbing the setting of the poise 32, the poise 34 is moved on the beam 7 to the 375 pounds indicium and the proper percentage weight 42 is placed on the hanger 41 to compensate for the surface moisture which, we will assume, amounts to four per cent of the coarser aggregate per se, or 15 pounds.

The indicator 22 now points to the 390 pounds indicium and is returned to zero when the proper amount of aggregate is added to the previously weighed out sand in the container.

It is not necessary to compensate for moisture in cement and we may weigh out the cement without removing the sand and coarser aggregate from the container or disturbing the setting of the poises 32 and 34, by moving the poise 33 on the beam 7, to the proper weight indicium which in this example is 94 pounds in the series 29, and pour cement to the aggregates in the container on the platform until the hand 22 again indicates the zero indicium. Additional beams may be provided to weigh a larger number of aggregates. Extensive investigations, in both laboratory and field, have established the fundamental law that the strength and other desirable properties of concrete are governed by the net quantity of mixing water used per unit of weight of cement and this quantity is governed by the conditions of the structure and the different degrees of exposure to which it will be subjected. In the example herein described, we will assume that the correct amount of water for the mix is 56 pounds. With the device in a balanced condition, that is, the indicator is in registry with the zero indicium and the load still on the platform, when the moisture percentage weights 42 are removed from the hangers 38 and 41, the automatic load counterbalancing pendulums are again overbalanced and move outwardly and upwardly proportionally to the amount of surface moisture compensated for by the moisture percentage weights and the indicator 22 revolves in a clockwise direction and indicates the amount of water clinging to the aggregates. In the example, the 8½ per cent of surface moisture in the sand is 22 pounds and 4 per cent adhering to the coarser aggregate amounts to 15 pounds. The indicator thus points to 37 pounds and the operator adds only sufficient water to cause the indicator 22 to point to the 56 pounds indicium on the chart 23.

In the introductory part of this description, the statement was made that one of the objects of the invention is the provision of means whereby permanent records may be made, both automatically and manipulatively, of the composition of batches of concrete, the date, and/or the location where they are finally poured. To fulfill this object, the scale is equipped with the automatic strip recorder 16 and the thereto coupled driving mechanism 13 which is operated by the movement of the counterbalancing pendulum mechanism 12. This driving mechanism comprises a bracket 44 which is securely fastened in a horizontal position to a vertically extending track frame 45, on which the pendulums 46 and 47 are fulcrumed by means of flexible metallic ribbons. This bracket is provided, on its upper faces, with V-grooved anti-friction tracks 48 on which a number of accurate bearing balls 49 are resting. These balls in turn support similar V-grooved anti-friction tracks 50 which are fastened to the lower side of a horizontally disposed carriage member 51. A rack 52 is pivotally secured to an upstanding fulcrum boss 53 on the carriage. The teeth of this rack mesh with a pinion 54 which is secured to a pinion shaft 55 to which also the indicator 22 is fastened. This shaft also carries the driving pinion 56 which translates the reciprocatory motion of the rack 57 into rotation of the indicator 22. The rack 57 is in a known manner operatively connected to the load counterbalancing pendulum mechanism 13.

When a load is placed on the platform 3, the force resulting from its weight actuates the counterbalancing mechanism in the manner hereinbefore described and as the carriage 51 of the recorder driving mechanism is actuated thereby, every angular movement of the indicator is again translated into a reciprocatory movement of the carriage 51 which is connected by a very light connecting bar 58 to the stylograph arm of the recorder. The recorder mechanism per se is well known and we will hereinafter describe only the improvements we have made therein. It is obvious that as the movement of the indicator is always in proportion to the load on the platform, the horizontal reciprocatory motion of the carriage 51 will also be in proportion and consequently, the length of the line traced by the stylograph of the recorder will be a measure of the weight of the load causing the initial movement. In the example hereinbefore considered, the concrete batch consisted of 259 pounds of sand, 375 pounds of a coarser aggregate, 94 pounds of cement and 56 pounds of water. Figure XIX illustrates a portion of a recording strip showing the curves automatically made when the ingredients for the batch of concrete are weighed and determined. The longitudinally extending lines printed thereon, represent the weights in pounds of the different materials. The distances between the curved transversely extending lines represent time intervals. The recording device is adapted for adjustment, that is, it may be adjusted to feed the strip at different rates per hour, to suit the speed with which the batch ingredients can be loaded and mixed. The zero or datum line on this strip is not located in the center, as the automatic load counterbalancing mechanism, which controls the recording stylograph, is adapted to move through a larger angle when the indicator is travelling in the anti-clockwise direction, than when it is travelling in the clockwise direction. When the device is in a balanced condition and the recording mechanism in operation, the stylograph will trace a line 59 which overlies the zero line of the recording strip. When a poise, for example poise 32, is moved on the beam 6 to the 259 pounds indicium to counterbalance the weight of the desired sand; the stylograph will trace the line 60 until its length is proportional to 259 pounds. The addition of the 8½ per cent moisture percentage weight will increase the length of the line 60 until it is proportional to 281 pounds. As 8½ per cent of 259 pounds equal 22 pounds, the sand is now placed in the receptacle on the platform on the scale. The line 61 represents the operation of loading the receptacle with the required 281 pounds of sand. The time interval for this operation is represented by the height of the curve, measured vertically from points 62 to 63. Similar graphs 64 and 65 represent the amount of coarse gravel and the cement placed in the receptacle on the platform. It will be noticed that whenever the required amount of each of the ingredients is placed on the platform, the stylograph returns to the zero line, as the device is then in a balanced condition. Any deviation from it would instantly show that the amount placed on the platform is inaccurate. When all the dry ingredients are on the platform, the percentage weights 42 are removed from the hangers and the stylograph will move on the other side of the zero or datum line of the recording strip a distance proportional to the amount of the surface moisture clinging to the aggregates, and tracing the line 66. The addition of the correct amount of water will trace the line 67 and the removal of the batch ingredients will return the stylograph to the zero line.

When the apparatus is started in the morning, the inspector or operator may mark the date and time at the beginning of the graph as at 68 and it is desirable that the ingredients be placed in the receptacle in a predetermined rotation and that the previously determined moisture percentage be noted on the batch graphs, for the sand at 69 and at 70 for the next aggregate. These notations need not be repeated until sand or an aggregate having a different moisture content are used. Each batch, it will be observed, has a series of characteristic graphs and the uniformity of the batches is readily ascertained by merely glancing at the strip, as the length and uniformity of the graphs are readily comparable. The time interval for each batch is also readily seen.

To later identify the location where each batch was placed, the operator or inspector makes identifying notes on the graph as at 71. To facilitate these manual notations, we have provided a small platen 72 directly underneath the recording strip 73 between the driving roller 74 and the idler roller 75; and have also provided a hinged cover 76 with a lock 77 so that unauthorized or fraudulent notations can be prevented (Figure X).

To facilitate simultaneous indications and records of the operations at a point remote from the device, for example, in the office of the supervising engineer or in case the device is used in connection with a central concrete mixing plant on top of the mixing tower, we have provided the device with a self-synchronous generator motor system which comprises a generator 80 mounted co-axially with the indicator shaft 55 and connected thereto by the clutch member 81. The generator 80 is mounted on a bracket 82 which in turn is fastened to the frame 45 and there is also provided a remote indicator (Figure XV) which consists of a circular housing 83 in which a frame 84 is fastened to brackets 85 and 86 which may be integral with the housing. A pair of ball bearings 87 support an indicator shaft to which an indicator 89 is fastened. The indicator 89 co-operates with an indicia bearing chart 90 which is a counterpart of the chart 23. This chart is mounted in back of the indicator 89 in the housing 83. A bracket 91, which is similar to the bracket 82, is fastened to the frame 84 and supports a motor 92 co-axially with the indicator shaft 88 and a coupling 93 is provided to operatively connect them. A recorder drive mechanism 94, which is a counterpart of the recorder drive mechanism 13, is driven by a pinion 95 which is mounted on the indicator shaft 88. As the construction and operation of the recorder drive mechanism are similar to the recorder drive mechanism 13, we have not particularly shown it in the drawings and will not describe it at great length. The carriage 96 is connected by a light connection 97 to the stylograph mechanism of the recorder 98.

When a self-synchronous generator motor system is employed, the field coils 99 of the generator are connected with the field coils 100 of the motor as shown in the wiring diagram (Figure XVIII). When the generator rotor is turned by the movement of the counterbalancing pendulum system 12, the indicator rotor will turn in synchronism and will assume a similar position at the end of the movement. As the operation of the self-synchronous generator motor systems per se are well known, we will not describe them in greater detail.

When, due to the action of a load on the platform 3, the pendulum counterbalancing system 12 is unbalanced, the indicator shaft 55 rotates the pinion 54 fastened to it, drives the rack 52 which is fastened to the carriage 51 of the recorder drive mechanism connected to the recorder 16 and causes it to trace the graphs hereinbefore described. The rotor of the generator of the self-synchronous motor generator system, being also directly connected to the indicator shaft 55, is also turned, and, since the rotor of the motor 92 turns to the same extent, the shaft 88 will move through the same angle as the indicator 23 and indicate a similar indicia. The pinion 95, being also mounted on the shaft 88, causes the recorder drive carriage 96 to actuate the stylograph of the recorder 98 similarly and a duplicate graph is traced on its recording strip. It will be seen from the foregoing that the embodiment of our invention is subject to modification and change to suit the requirements to which the construction is to be adapted, for example, it may be desirable that only the remote indicator be provided with a graphic recorder. This is easily accomplished by omitting this mechanism in the weighing device.

It is customary in scientific concrete batch mixing, to make a sieve analysis to determine whether the aggregates have just the correct proportion of large medium and fine particles, as it is essential that they are of such composition that all the voids between the larger fragments of rock are completely filled by the finer particles. The device, therefore, has also been so designed to enable the operator to make this analysis with great facility. Aggregate is poured into the receptacle 18 until its weight overbalances the counterbalancing pendulum mechanism 12 and thereby turns the indicator in the clockwise direction to the 100 pounds indicium on the chart 23. This quantity represents 100 per cent of the sample and will weigh slightly less than one pound. This sample is now placed in the upper sieve of a nest of standard sieves and shaken by hand or by means of a shaking apparatus built for this purpose. As the meshes of these sieves are graduated in size, and the one with largest openings is placed on top and the one with the smallest opening on the bottom, the different size particles are readily separated, and particles of uniform size will remain in each sieve. The contents of each sieve are then placed separately into the receptacle 18; and the indicia indicated by the indicator 22 on the chart 23 represents the percentage of the total, of that particular size particle, in the sample. The engineer in charge of the structure may thus easily select aggregates having the proper proportion of the different particles. It has been found that greater economy can thus be realized in obtaining the desired strength of the concrete.

At times it may be advisable to know the amount of water of crystallization or in other words, the percentage of water absorbed in the structure of the aggregates. This is determined in exactly the same manner as the amount of surface moisture hereinbefore described, with the exception that the sample is bone dry, that is, the sample was previously exposed to a temperature sufficiently high to drive out all absorbed moisture. The percentage of this moisture will be indicated by the graduations below the zero indicium on the table 26 (Figure XII).

It is obvious that the embodiment of the invention herein illustrated and described is well suited to fulfill the objects primarily stated. It is to be understood, however, that the invention is susceptible to variation, modification and change within the spirit and scope of the subjoined claims.

Having described our invention we claim:

1. In a device for determining specific gravity of materials, means comprising in combination, a lever having a fulcrum pivot extending at right angles to its longitudinal axis, a pair of material receptacle suspension pivots fixed in said lever, said pivots being axially aligned with each other, and a pair of material receptacles having similar physical characteristics and adapted to be interchangeably suspended at the same time, one receptacle from one of said suspension pivots, the other receptacle from the other.

2. In a weighing device, in combination, automatic load counterbalancing mechanism, load indicating mechanism, load supporting mechanism and load receiving mechanism co-operating therewith, said load supporting mechanism comprising a lever having a fulcrum pivot and a pair of suspension pivots carried by said lever being axially aligned with each other, a pair of material receptacles interchangeably suspended one from each of said suspension pivots, said receptacles having similar physical characteristics, said load indicating mechanism comprising a chart having a plurality of tables of indicia, one of said tables of indicia co-operating with said counterbalancing mechanism and one of said material receptacle suspension pivots to indicate the weight of material suspended therefrom and another of said tables of indicia co-operating with the other material receptacle suspension pivot to indicate the specific gravity of such material.

3. In a weighing device, in combination, load receiving mechanism, load counterbalancing mechanism and load indicating mechanism in co-operative relation therewith, said load counterbalancing mechanism comprising a lever having a fulcrum pivot and a pair of receptacle suspension pivots in spaced relation to the fulcrum pivot and being axially aligned with each other, and a pair of material receptacles having similar physical characteristics removably supported upon said suspension pivots, one only of said receptacles being immersed in water contained in a tank secured to a stationary member of the counterbalancing mechanism, said load indicating mechanism comprising a relatively movable chart and indicator actuated by said load counterbalancing mechanism, said chart having a plurality of series of indicia, one of said series representing weights of amounts of materials.

4. In a weighing device of the type described, in combination, load receiving mechanism, automatic load counterbalancing mechanism operatively connected thereto, said load counterbalancing mechanism comprising a lever having a fulcrum pivot and a pair of suspension pivots in spaced relation to said fulcrum pivot and being axially aligned with each other, a receptacle suspended from one of said suspension pivots for the reception of material having two constituents and means for determining the amount, by weight, of one of said constituents in said material.

5. In a weighing device of the type described, in combination, load receiving mechanism, automatic load counterbalancing mechanism operatively connected thereto, and automatic load indicating mechanism actuated thereby, said load counterbalancing mechanism comprising a lever having a fulcrum pivot and a pair of receptacles, suspension pivots in spaced relation to said fulcrum pivot and being axially aligned with each other, and a pair of material receptacles suspended from said suspension pivots, said automatic load indicating mechanism comprising a series of indicia, one of said series of indicia representing a predetermined amount of material at various specific gravities and another of said series of indicia representing the amount of moisture in such material, each of said suspension pivots co-operating with a different one of said series of indicia when such material is placed in said receptacle.

6. In a weighing device of the type described, in combination, load receiving mechanism, automatic load counterbalancing mechanism operatively connected thereto, and automatic load indicating mechanism actuated thereby, said load counterbalancing mechanism comprising a lever having a fulcrum pivot and a pair of receptacle suspension pivots in spaced relation to said fulcrum pivot and being axially aligned with each other, and a pair of receptacles for the reception of material suspended from said suspension pivots, and said counterbalancing mechanism, said material receptacles and said indicating mechanism being adapted for co-operation to determine the amount of moisture in such material.

7. In a weighing device of the type described, in combination, load receiving mechanism, automatic load counterbalancing mechanism operatively connected thereto, and automatic load indicating mechanism actuated thereby, said load counterbalancing mechanism comprising a lever having a fulcrum pivot and a pair of receptacle suspension pivots in spaced relation to said fulcrum pivot and being axially aligned with each other transversely of said lever, and a pair of material receptacles suspended from said pivots for the reception of material to be tested, said automatic load indicating mechanism comprising a series of indicia, one of said series of indicia representing the amount of moisture in such material.

8. In a weighing device of the type described, in combination, load receiving mechanism, automatic load counterbalancing mechanism operatively connected thereto, and automatic load indicating mechanism actuated thereby, said load counterbalancing mechanism comprising a lever having a fulcrum pivot, and a pair of receptacle suspension pivots in spaced relation thereto and being axially aligned with each other transversely of said lever, a pair of material receptacles suspended from said suspension pivots, at least one of said material receptacles, when suspended from one of said pivots, being suspended in a water tank disposed beneath said one pivot; said automatic load indicating mechanism comprising a series of indicia, one of said series of indicia co-operatng with unimmersed receptacle, said receptacle co-operating with a different one of said series of indicia when said receptacles are interchanged on said pivots.

9. In a device of the type described, in combination, load receiving mechanism, load counterbalancing mechanism operatively connected thereto and load indicating mechanism actuated thereby; said load counterbalancing mechanism comprising automatic load offsetting pendulum mechanism and manipulative load offsetting means; said load indicating mechanism including a relatively movable chart and indicator, said chart having weight indicia representing a portion of its maximum weighing capacity extending in clockwise sequence from a zero indication, and having weight indicia representng the remainder of its maximum weighing capacity extending in an anti-clockwise sequence from said zero indication.

10. In a device of the type described, in combination, load receiving mechanism, load counterbalancing mechanism operatively connected thereto and automatic load indicating mechanism actuated thereby; said load counterbalancing mechanism comprising automatic load offsetting pendulum mechanism and manipulating load offsetting means; said load indicating mechanism including a relatively movable chart and indicator, said chart having weight indicia representing a portion of its maximum weighing capacty extending in clockwise sequence from a zero indication, and having other weight indicia representing the remainder of its maximum weighing capacity extending in an anti-clockwise sequence from said zero indication, said indicator co-operatng with said pendulum load offsetting means and said clockwise extending sequence of indicia to indicate weights of loads placed on said load receiving mechanism and offset by said automatic load offsetting pendulum mechanism.

11. In a device of the type described, in combination, load receiving mechanism, load counterbalancing mechanism operatively connected thereto, and automatic load indicating mechanism actuated thereby, said load counterbalancing mechanism comprising automatic load offsetting pendulums and manipulative load offsetting means, said load indicating mechanism including a relatively movable chart and indicator, said chart having a series of weight indicia representing a portion of its maximum weighing capacity extending in clockwise sequence from a zero indication and having another series of weight indicia representing the remainder of its maximum weighing capacity extending in anti-clockwise sequence from said zero indication and said indicator co-operating with said automatic load offsetting pendulums and said manipulative weight offsetting means to indicate on said series of indicia extending in anti-clockwise sequence the offsetting effect of said manipulative load offsetting means.

12. In a device of the type described, in combination, load receiving mechanism, load counterbalancing mechanism operatively connected thereto, and automatic load indicating mechanism actuated thereby, said load counterbalancing mechanism comprising automatic load offsetting pendulum mechanism and manipulative load offsetting means, said load indicating mechanism including a relatively movable chart and indicator, said chart having a series of weight indicia representing a portion of its maximum weighing capacity extending in clockwise sequence from a zero indication and having another series of weight indicia representing the remainder of its maximum weighing capacity extending in anti-clockwise sequence from said zero indication, said indicator co-operating with said pendulum load offsetting means and said clockwise extending sequence of indicia to indicate weights of loads placed on said load receiving mechanism and offset by said automatic load offsetting pendulum mechanism, and said indicator co-operating with said automatic load offsetting pendulums and said manipulative offsetting means to indicate on said anti-clockwise sequence of indicia the offsetting effect of said manipulative offsetting means.

13. In a device of the type described, in combination, a lever, a capacity beam secured thereto having a load offsetting poise mounted thereon, said lever having a fulcrum pivot and a plurality of receptacle suspension pivots in spaced relation with said fulcrum pivot and axially aligned with each other and a receptacle supporting pivot fixed in said load offsetting poise, characterized in that the knife edges of said fulcrum pivot, said axially aligned receptacle suspension pivots and said receptacle supporting pivot in said poise lie substantially in one plane.

14. An apparatus for determining the specific gravity of materials comprising, in combination, a lever having a fulcrum pivot extending at right angles to the longitudinal axis of said lever, a pair of axially aligned suspension pivots carried by said lever, a pair of material receptacles having similar physical characteristics and adapted to be interchangeably suspended at the same time from said suspension pivots, at least one of said material receptacles, when suspended from one of said pivots, being suspended in a water tank disposed beneath said one pivot.

15. A scale mechanism comprising load receiving means, manipulative load counterbalancing means comprising a lever connected to said load receiving means and a plurality of poises slidably mounted on said lever, automatic load counterbalancing means comprising a plurality of pendulums each being movable in one direction from its zero position in response to weights on said load receiving means and in another direction from its zero position in accordance with the movement of said poises from their zero position along said lever, and means for selectively increasing the weight of one of said poises by a desired percentage of the weight of said poise.

16. A scale mechanism comprising in combination, load receiving means, load counterbalancing mechanism operatively connected thereto and automatic load indicating means actuated thereby, said load counterbalancing mechanism comprising automatic load counterbalancing mechanism and manipulative load offsetting means coacting with and supplementing each other, said manipulative load offsetting means having a normal load offsetting value and independent means adapted for cooperation with said maniplative load offsetting means to increase the normal load-offsetting value thereof by a predetermined percentage, said automatic load indicating means comprising a relatively movable chart and indicator, said chart having weight indicia representing a portion of its maximum weighing capacity extending in clockwise sequence from a zero indication and having weight indicia representing the remainder of its maximum weighing capacity extending in an anti-clockwise sequence from said zero indication, said automatic load counterbalancing mechanism comprising a plurality of pendulum devices each of which is so mounted that it may swing in either of two directions from its position when the said indicator registers with said zero indication, and means for causng each of said pendulums to swing in one direction from its said zero position by increasing the load counterbalancing effect of said manipulative load counterbalancing means and to swing in the other direction from its zero position by the addition of a load to said load receiving means.

17. A scale mechanism comprising in combination, load receiving means, load counterbalancing means operatively connected thereto and automatic load indicating means actuated thereby, said load counterbalancing means comprising automatic load counterbalancing mechanism and manipulative load offsetting means coacting with and supplementing each other, said automatic load indicating means comprising a relatively movable chart and indicator, said chart having weight indicia representing a portion of its maximum weighing capacity extending in clockwise sequence from a zero indication and having weight indicia representing a portion of its maximum weighing capacity extending in an anti-clockwise sequence from said zero indication, said automatic load counterbalancing mechanism comprising a plurality of pendulum devices each of which is so mounted that it may swing in either of two directions from its position when said indicator registers with said zero indication, and means for causing each of said pendulum devices to swing in one direction from its said zero position by increasing the load counterbalancing effect of said manipulative load counterbalancing means and to swing in the other direction from its zero position by the addition of a load to said load receiving means.

18. A scale mechanism for successively weighing out the ingredients of an accumulating batch comprising load receiving means, manipulative load counterbalancing means operatively connected thereto and automatic load counterbalancing and indicating means actuated thereby, said automatic load counterbalancing means having automatic weighing capacity at least equal to that required for weighing one of such ingredients, the automatic load counterbalancing means being so constructed and arranged and being so connected to the manipulative load counterbalancing means that the manipulative load counterbalancing means when in such position as to exert no load counterbalancing effect maintains the automatic load counterbalancing and indicating means in a position from which it may be moved in either of two directions to counterbalance a substantial proportion of its automatic load counterbalancing capacity or to indicate the counterbalancing condition in which said manipulative load counterbalancing means is set.

19. A scale mechanism for successively weighing out the ingredients of an accumulating batch comprising load receiving means, manipulative load counterbalancing means operatively connected thereto and automatic load counterbalancing and indicating means operated thereby, said automatic load counterbalancing means having automatic weighing capacity at least equal to that required for weighing one of such ingredients, the automatic load counterbalancing and indicating means comprising a plurality of pendulums, said pendulums being so connected to the manipulative load counterbalancing means that when the manipulative load counterbalancing and indicating means are in such position that they exert no load counterbalancing effect, said pendulums are supported in a position from which they may be moved in either of two directions to counterbalance a substantial proportion of their automatic load counterbalancing capacity and to indicate the counterbalancing condition in which said manipulative load counterbalancing means is set.

20. A scale mechanism for successively weighing out the ingredients of an accumulating batch comprising load receiving means, manipulative load counterbalancing means operatively connected thereto and automatic load counterbalancing and indicating means operated thereby, said automatic load counterbalancing means having automatic weighing capacity at least equal to that required for weighing one of such ingredients, the automatic load counterbalancing means comprising a plurality of pendulums, and means connecting said pendulums and said manipulative load counterbalancing means and being so constructed and arranged that when the manipulative load counterbalancing means are in such position that no load counterbalancing effect is exerted thereby the pendulums are supported in a position from which they may be moved in either of two directions to weigh a substantial proportion of the weighing capacity of said pendulums and to indicate the counterbalancing condition in which said manipulative load counterbalancing means is set.

21. A scale mechanism for successively weighing out the ingredients of an accumulating batch comprising load receiving means, manipulative load counterbelancing means connected thereto and automatic load counterbalancing means actuated thereby and being so supported that it may move throughout a substantial proportion of its total range of movement in either direction from its no-load position, an indicator operatively connected to the automatic load counterbalancing means and a chart associated with said indicator, the automatic load counterbalancing means being so supported and so connected to the manipulative load counterbalancing means and an increase in the load counterbalancing effect of the manipulative load counterbalancing means causes a proportional and corresponding movement of the automatic load counterbalancing means away from its no load position and causes the load counterbalancing condition of said automatic load counterbalancing means to be indicated on the chart, and the automatic load counterbalancing means being so connected to the load receiving means that a load on the load receiving means equal to the indicated load counterbalancing effect of the manipulative load counterbalancing means is effective to return the automatic load counterbalancing means to its no load position as indicated on the chart.

22. A scale mechanism for successively weighing out the ingredients of an accumulating batch comprising load receiving means, manipulative load counterbalancing means operatively connected thereto and automatic load counterbalancing and indicating means operatively connected thereto and actuated thereby, said automatic load counterbalancing means having weighing capacity at least equal to that required for weighing one of such ingredients, the manipulative load counterbalancing means and the automatic load counterbalancing and indicating means being so connected and arranged that when there is no load on said load receiving means and said manipulative load counterbalancing means is in no-load counterbalancing condition said automatic load counterbalancing means is in condition to exert a substantial proportion of its load counterbalancing effect, whereby an increase in the load counterbalancing effect of the manipulative load counterbalancing means causes a corresponding movement of the automatic load counterbalancing means in one direction and causes the load counterbalancing condition of said manipulative load counterbalancing means to be indicated, and the load receiving means and the automatic load counterbalancing means being so connected and arranged that a load placed on the load receiving means causes a corresponding movement of the automatic load counterbalancing means in a direction opposite to the movement produced by an increase in the load counterbalancing effect of the manipulative load counterbalancing means.

23. A scale mechanism for successively weighing out the ingredients of an accumulating batch comprising a pivoted lever, automatic load counterbalancing means supported for movement in either direction from its normal position of rest, said automatic load counterbalancing means having weighing capacity at least equal to that required for weighing one of such ingredients and being capable of such movement in either direction through a substantial proportion of its total range of movement and being so connected to said lever that movement of the lever in either direction about its pivot causes a corresponding movement of the automatic load counterbalancing means from its normal position of rest, manipulative load counterbalancing means connected to said lever for movement in one direction with respect to the pivot thereof to increase the load counterbalancing effect of said manipulative means and movable in the opposite direction with respect to the pivot thereof to decrease the load counterbalancing effect of said manipulative means, load receiving means so connected to said lever that a load placed on the load receiving means causes a movement of the lever in a direction opposite to the movement of the lever produced by an increase in the load counterbalancing effect of said manipulative means, and a graphic recorder connected to said automatic load counterbalancing means to successively record its positions.

24. A scale mechanism for successively weighing out the ingredients of an accumulating batch comprising a pivoted lever, automatic load counterbalancing means supported for movement in either direction from its normal position of rest, said automatic load counterbalancing means having weighing capacity at least equal to that required for weighing one of said ingredients and being capable of such movement in either direction throughout a substantial proportion of its total range of movement, means connecting said automatic means to said lever at one side of the pivot thereof whereby movement of the lever in either direction about its pivot causes a corresponding movement of the automatic means, manipulative load counterbalancing means supported on said lever for movement away from the connection thereto of said automatic means to increase the load counterbalancing effect of said manipulative means, and load receiving means connected to said lever at the same side of the pivot thereof as the connection thereto of said automatic means, whereby an increase in the load counterbalancing effect of the manipulative means causes a movement of the lever and automatic means in one direction and a load placed on the load receiving means causes a movement of the lever and automatic means in the opposite direction, and a graphic recorder connected to said automatic means to record its positions.

25. A scale mechanism for sucessively weighing out the ingredients of an accumulating batch comprising load receiving means, variable load counterbalancing means operatively connected thereto and comprising a pivoted lever and a plurality of elongated beams connected thereto and movable therewith, each of said beams having at least one graduated scale marked thereon and a counterpoise associated with each such scale, automatic load counterbalancing means operatively connected to said variable means and actuated thereby and comprising pendulum means, said load receiving means and said variable and automatic means being so connected and arranged that removal of all load from the load receiving means and positioning of all of the counterpoises of the variable means at their zero positions on their respective scales causes said pendulum means to be supported in a position in which they exert a substantial proportion of their total load counterbalancing effect and being so connected and arranged that an increase in the load counterbalancing effect of any of said counterpoises causes a corresponding movement of said pendulum means in one direction from said position, the load receiving means and the automatic means being so connected and arranged that a load placed on the load receiving means causes a corresponding movement of said pendulum means in a direction opposite to the movement thereof produced by an increase in the load counterbalancing effect of the adjustable means.

26. A scale mechanism for successively weighing out the ingredients of an accumulating batch comprising load receiving means, variable load counterbalancing means operatively connected thereto and comprising a pivoted lever and an elongated beam connected thereto and movable therewith and having a plurality of graduated scales marked thereon and a counterpoise associated with each such scale, automatic load counterbalancing means operatively connected to said variable means and actuated thereby and comprising pendulum means, said load receiving means and said variable and automatic means being so connected and arranged that removal of all load from the load receiving means and positioning of the counterpoises of the variable means at their zero positions on their respective scales causes said pendulum means to be supported in a position in which they exert a substantial proportion of their total load counterbalancing effect, and being so connected and arranged that an increase in the load counterbalancing effect of any of said counterpoises causes a corresponding movement of said pendulum means in one direction from said position, the load receiving means and the automatic means being so connected and arranged that a load placed on the load receiving means causes a corresponding movement of said pendulum means in a direction opposite to the movement thereof produced by an increase in the load counterbalancing effect of the variable means.

27. A scale mechanism for successively weighing out the ingredients of an accumulating batch comprising load receiving means, variable load counterbalancing means operatively connected thereto and comprising a pivoted lever and a plurality of elongated beams connected thereto and movable therewith, each of said beams having at least one counterpoise slidably mounted thereon, automatic load counterbalancing means operatively connected to said variable means and actuated thereby and comprising pendulum means, said load receiving means and said variable and automatic means being so connected and arranged that removal of all load from the load receiving means and positioning of the counterpoises of the variable means at their zero or no-load positions on their respective beams causes said pendulum means to be supported in a position in which they exert a substantial proportion of their total load counterbalancing effect and being so connected and arranged that an increase in the load counterbalancing effect of any of said counterpoises causes a corresponding movement of said pendulum means in one direction from said position, the load receiving means and the automatic means being so connected and arranged that a load placed on the load receiving means causes a corresponding movement of said pendulum means in a direction opposite to the movement thereof produced by an increase in the load counterbalancing effect of the variable means.

28. A scale mechanism for successively weighing out the ingredients of an accumulating batch comprising load receiving means, variable load counterbalancing means operatively connected thereto and comprising a pivoted lever and an elongated beam connected thereto and movable therewith and having a plurality of counterpoises slidably mounted thereon, automatic load counterbalancing means operatively connected to said variable means and actuated thereby and comprising pendulum means, said load receiving means and said variable and automatic means being so connected and arranged that removal of all load from the load receiving means and positioning of the counterpoises of the variable means in their respective zero or no-load positions on said beam causes said pendulum means to be supported in a position in which they exert a substantial proportion of their total load counterbalancing effect and being so connected and arranged that an increase in the load counterbalancing effect of any of said counterpoises causes a corresponding movement of said pendulum means in one direction from said position, the load receiving means and the automatic means being so connected and arranged that a load placed on the load receiving means causes a corresponding movement of said pendulum means in a direction opposite to the movement thereof produced by an increase in the load counterbalancing effect of the variable means.

29. A scale mechanism for successively weighing out the ingredients of an accumulating batch, comprising load receiving means, a lever connected to said load receiving means and actuated thereby, automatic load counterbalancing means connected to said lever to be actuated thereby and comprising pendulum means, a plurality of beams connected to said lever and movable therewith, adjustable load counterbalancing means associated with each of said beams, said load receiving means and said automatic means and said lever being so connected and arranged that removal of all load from the load receiving means and positioning of said adjustable means at zero or no-load positions with respect to said beams causes said pendulum means to be supported in a position in which they exert a substantial proportion of their total load counterbalancing effect and being so connected and arranged that an increase in the load counterbalancing effect of any of said adjustable means causes a corresponding movement of said pendulum means in one direction from said position, the load receiving means and the automatic means being so connected and arranged that a load placed on the load receiving means causes a corresponding movement of said pendulum means in a direction opposite to the movement thereof produced by an increase in the load counterbalancing effect of the adjustable means.

30. A scale mechanism for successively weighing out the ingredients of an accumulating batch, comprising load receiving means, a lever connected to said load receiving means and actuated thereby, automatic load counterbalancing means connected to said lever to be actuated thereby and comprising pendulum means, a beam connected to said lever and movable therewith, a plurality of adjustable load counterbalancing means associated with said beam, said load receiving means and said automatic means and said lever being so connected and arranged that removal of all load from the load receiving means and positioning of said adjustable means at their zero or no-load positions with respect to said beams causes said pendulum means to me supported in a position in which they exert a substantial proportion of their total load counterbalancing effect, and being so connected and arranged that an increase in the load counterbalancing effect of any of said adjustable means causes a corresponding movement of said pendulum means in one direction from said position, the load receiving means and the automatic means being so connected and arranged that a load placed on the load receiving means causes a corresponding movement of said pendulum means in a direction opposite to the movement thereof produced by an increase in the load counterbalancing effect of the adjustable means.

31. A scale mechanism for successively weighing out the ingredients of an accumulating batch comprising load receiving means, variable load counterbalancing means operatively connected thereto and comprising a pivoted lever and a plurality of elongated beams connected thereto and movable therewith, each of said beams having at least one graduated scale marked thereon and a counterpoise associated with each such scale, automatic load counterbalancing means operatively connected to said variable means and actuated thereby and comprising pendulum means, indicating means comprising a pointer actuated by said pendulum means and a chart co-operating therewith, said load receiving means and said variable and automatic means being so connected and arranged that removal of all load from the load receiving means and positioning of all of the counterpoises of the variable means at their zero positions on their respective scales causes said pendulum means to be supported in a position in which they exert a substantial proportion of their total load counterbalancing effect, and in which the pointer is caused to indicate the zero indicium on the chart and being so connected and arranged that an increase in the load counterbalancing effect of any of said counterpoises causes a corresponding movement of said pendulum means and causes said pointer to be moved in one direction from said position to indicate the amount of such increase, the load receiving means and the automatic means being so connected and arranged that a load placed on the load receiving means causes a corresponding movement of said pendulum means and pointer in a direction opposite to the movement thereof produced by an increase in the load counterbalancing effect of the adjustable means.

32. A scale mechanism for successively weighing out the ingredients of an accumulating batch comprising load receiving means, variable load counterbalancing means operatively connected thereto and comprising a pivoted lever and an elongated beam connected thereto and movable therewith and having a plurality of graduated scales marked thereon and a counterpoise associated with each such scale, automatic load counterbalancing means operatively connected to said variable means and actuated thereby and comprising pendulum means, indicating means comprising a chart and a pointer movable thereover and which is connected to said pendulum means to be actuated thereby, said load receiving means and said variable and automatic means being so connected and arranged that removal of all load from the load receiving means and positioning of all of the counterpoises of the variable means at their zero positions on their respective scales causes said pendulum means to be supported in a position in which they exert a substantial proportion of their total load counterbalancing effect, and causes said pointer to be operated to indicate the zero indicium on said chart and being so connected and arranged that an increase in the load counterbalancing effect of any of said counterpoises causes a corresponding movement of said pendulum means in one direction from said position and causes said pointer to indicate on said chart the increase in the load counterbalancing effect of said counterpoises, the load receiving means and the automatic means being so connected and arranged that a load placed on the load receiving means causes a corresponding movement of said pendulum means and said pointer in directions opposite to the movements thereof produced by an increase in the load counterbalancing effect of the variable means.

33. A scale mechanism for successively weighing out the ingredients of an accumulating batch comprising load receiving means, variable load counterbalancing means operatively connected thereto and comprising a pivoted lever and a plurality of elongated beams connected thereto and movable therewith, each of said beams having at least one counterpoise slidably mounted thereon, automatic load counterbalancing means operatively connected to said variable means and actuated thereby and comprising pendulum means, indicating means comprising a chart and an indicator movable thereover and connected to said pendulum means to be operated thereby, said load receiving means and said variable and automatic means being so connected and arranged that removal of all load from the load receiving means and positioning of all of the counterpoises of the variable means at their zero or no-load positions on their respective beams causes said pendulum means to be supported in a position in which they exert a substantial proportion of their total load counterbalancing effect and causes said indicator to be operated to the zero position on said chart and being so connected and arranged that an increase in the load counterbalancing effect of any of said counterpoises causes a corresponding movement of said pendulum means in one direction from said position and causes a movement of said indicator over said chart to indicate thereon the increase in the load counterbalancing effect of said counterpoises, the load receiving means and the automatic means being so connected and arranged that a load placed on the load receiving means causes corresponding movements of said pendulum means and said indicator in directions opposite to the movement thereof produced by an increase in the load counterbalancing effect of the variable means.

34. A scale mechanism for successively weighing out the ingredients of an accumulating batch comprising load receiving means, variable load counterbalancing means operatively connected thereto and comprising a pivoted lever and an elongated beam connected thereto and movable therewith and having a plurality of counterpoises slidably mounted thereon, automatic load counterbalancing means operatively connected to said variable means and actuated thereby and comprising pendulum means, indicating means comprising a chart and a pointer movable thereover and connected to said pendulum means to be operated thereby, said load receiving means and said variable and automatic means being so connected and arranged that removal of all load from the load receiving means and positioning of all of the counterpoises of the variable means in their respective zero or no-load positions on said beam causes said pendulum means to be supported in a position in which they exert a substantial proportion of their total load counterbalancing effect and causes said pointer to be operated to indicate the zero indicium on said chart and being so connected and arranged that an increase in the load counterbalancing effect of any of said counterpoises causes a corresponding movement of said pendulum means in one direction from said position and causes a movement of said pointer over said chart to indicate thereon the increase in the load counterbalancing effect of said counterpoises, the load receiving means and the automatic means being so connected and arranged that a load placed on the load receiving means causes corresponding movements of said pendulum means and said pointer in directions opposite to the movements thereof produced by an increase in the load counterbalancing effect of the variable means.

35. A scale mechanism for successively weighing out the ingredients of an accumulating batch, comprising load receiving means, a lever connected to said load receiving means and actuated thereby, automatic load counterbalancing means connected to said lever to be actuated thereby and comprising pendulum means, indicating means comprising a chart and a pointer movable thereover and connected to said pendulum means to be actuated thereby, a plurality of beams connected to said lever and movable therewith, adjustable load counterbalancing means associated with each of said beams, said load receiving means and said automatic means and said lever being so connected and arranged that removal of all load from the load receiving means and positioning of said adjustable means at their zero or no-load positions with respect to said beams causes said pendulum means to be supported in a position in which they exert a substantial proportion of their total load counterbalancing effect and causes said pointer to indicate the zero indicium on said scale and being so connected and arranged that an increase in the load counterbalancing effect of any of said adjustable means causes a corresponding movement of said pendulum means in one direction from said position and causes said pointer to be moved to indicate on said chart the increase in the load counterbalancing effect of said adjustable means, the load receiving means and the automatic means being so connected and arranged that a load placed on the load receiving means causes a corresponding movement of said pendulum means and said pointer in directions opposite to the movements thereof produced by an increase in the load counterbalancing effect of the adjustable means.

36. A scale mechanism for successively weighing out the ingredients of an accumulating batch, comprising load receiving means, a lever connected to said load receiving means and actuated thereby, automatic load counterbalancing means connected to said lever to be actuated thereby and comprising pendulum means, indicating means comprising a chart and a pointer movable thereover and connected to said pendulum means to be actuated thereby, a beam connected to said lever and movable therewith, a plurality of adjustable load counterbalancing means associated with said beam, said load receiving means and said automatic means and said lever being so connected and arranged that removal of all load from the load receiving means and positioning of said adjustable means at their zero or no-load positions with respect to said beams causes said pendulum means to be supported in a position in which they exert a substantial proportion of their total load counterbalancing effect and causes said pointer to be moved to indicate the zero indicium on said chart and being so connected and arranged that an increase in the load counterbalancing effect of any of said adjustable means causes a corresponding movement of said pendulum means in one direction from said position sufficient to cause said pointer to indicate on said chart the increase in the load counterbalancing effect of said adjustable means, the load receiving means and the automatic means being so connected and arranged that a load placed on the load receiving means causes corresponding movements of said pendulum means and said pointer in directions opposite to the movement thereof produced by an increase in the load counterbalancing effect of the adjustable means.

37. A scale mechanism for successively weighing out the ingredients of an accumulating batch comprising load receiving means, variable load counterbalancing means operatively connected thereto and comprising a pivoted lever and a beam connected thereto and movable therewith and having a plurality of graduated scales marked thereon and a counterpoise associated with each such scale, automatic load counterbalancing means operatively connected to said variable means and actuated thereby, said load receiving means and said variable and automatic means being so connected and arranged that removal of all load from the load receiving means and positioning of the counterpoises of the variable means at their zero positions on their respective scales causes said automatic means to be operated to a position in which it exerts a substantial proportion of its total load counterbalancing effect, and being so connected and arranged that an increase in the load counterbalancing effect of any of said counterpoises causes a corresponding movement of said automatic means in one direction from said position, the load receiving means and the automatic means being so connected and arranged that a load placed on the load receiving means causes a corresponding movement of said automatic load counterbalancing means in a direction opposite to the movement thereof produced by an increase in the load counterbalancing effect of the variable means.

38. A scale mechanism for successively weighing out the ingredients of an accumulating batch comprising load receiving means, variable load counterbalancing means operatively connected thereto and comprising a pivoted lever and a beam connected thereto and movable therewith and having a plurality of counterpoises slidably mounted thereon, automatic load counterbalancing means operatively connected to said variable means and actuated thereby, said load receiving means and said variable and automatic means being so connected and arranged that removal of all load from the load receiving means and positioning of the counterpoises of the variable means in their respective zero or no-load positions on said beams causes said automatic load counterbalancing means to be operated to a position in which it exerts a substantial proportion of its total load counterbalancing effect, and being so connected and arranged that an increase in the load counterbalancing effect of any of said counterpoises causes a corresponding movement of said automatic means in one direction from said position, the load receiving means and the automatic means being so connected and arranged that a load placed on the load receiving means causes a corresponding movement of said automatic means in a direction opposite to the movement thereof produced by an increase in the load counterbalancing effect of the variable means.

39. A scale mechanism for successively weighing out the ingredients of an accumulating batch, comprising load receiving means, a lever connected to said load receiving means and actuated thereby, automatic load counterbalancing means connected to said lever to be actuated thereby, a plurality of beams connected to said lever and movable therewith, adjustable load counterbalancing means associated with each of said beams, said load receiving means and said automatic means and said lever being so connected and arranged that removal of all load from the load receiving means and positioning of said adjustable means at zero or no-load positions with respect to said beams causes said automatic means to be operated to a position in which it exerts a substantial proportion of its total load counterbalancing effect, and being so connected and arranged that an increase in the load counterbalancing effect of any of said adjustable means causes a corresponding movement of said automatic means in one direction from said position, the load receiving means and the automatic means being so connected and arranged that a load placed on the load receiving means causes a corresponding movement of said automatic means in a direction opposite to the movement thereof produced by an increase in the load counterbalancing effect of the adjustable means.

40. A scale mechanism for successively weighing out the ingredients of an accumulated batch, comprising load receiving means, a lever connected to said load receiving means and actuated thereby, automatic load counterbalancing means connected to said lever to be actuated thereby, a beam connected to said lever and movable therewith, a plurality of adjustable load counterbalancing means associated with said beam, said load receiving means and said automatic means and said lever being so connected and arranged that removal of all load from the load receiving means and positioning of said adjustable means at their zero or no-load position with respect to said beams causes said automatic means to be operated to a position in which it exerts a substantial proportion of its total load counterbalancing effect, and being so connected and arranged that an increase in the load counterbalancing effect of any of said adjustable means causes a corresponding movement of said automatic means in one direction from said position, the load receiving means and the automatic means being so connected and arranged that a load placed on the load receiving means causes a corresponding movement of said automatic means in a direction opposite to the movement thereof produced by an increase in the load counterbalancing effect of the adjustable means.

SIDNEY F. MASHBIR.
MARK A. WECKERLY.